Jan. 30, 1968     I. S. KNIGHT ET AL     3,366,776
HOLDER FOR AN ELECTRICALLY HEATED COOKING VESSEL
Filed April 20, 1965     4 Sheets-Sheet 1

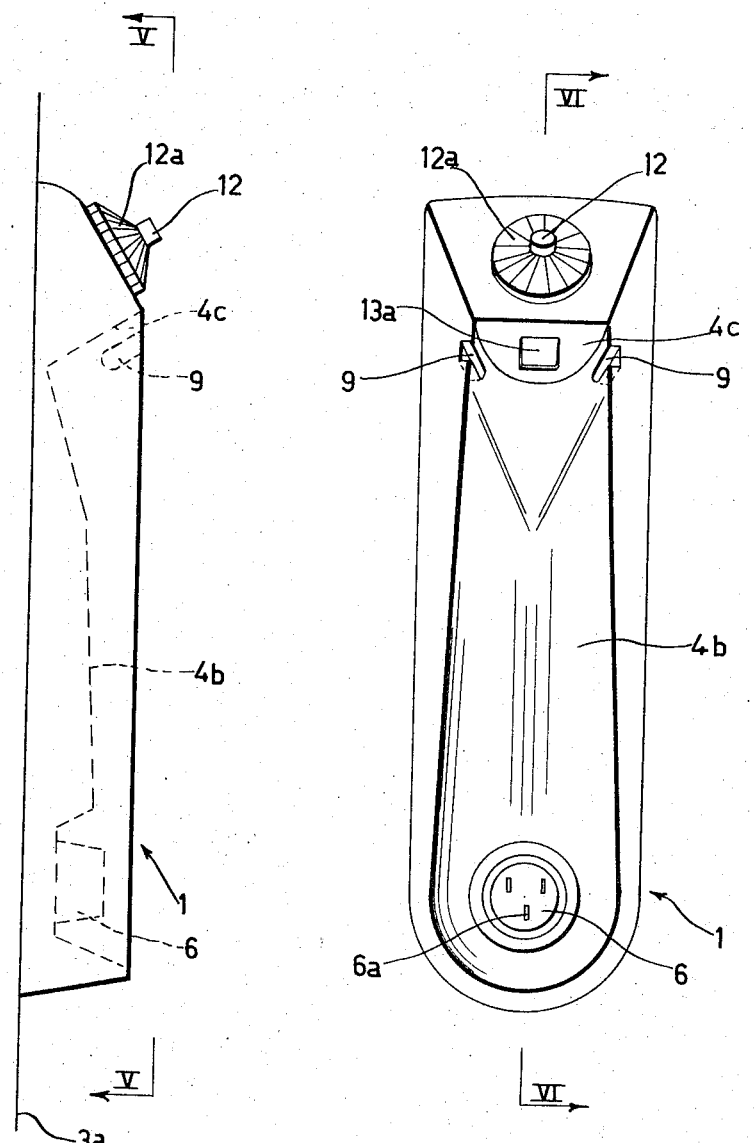

Jan. 30, 1968  I. S. KNIGHT ET AL  3,366,776
HOLDER FOR AN ELECTRICALLY HEATED COOKING VESSEL
Filed April 20, 1965  4 Sheets-Sheet 4

United States Patent Office 3,366,776
Patented Jan. 30, 1968

3,366,776
HOLDER FOR AN ELECTRICALLY HEATED COOKING VESSEL
Irwin Sydney Knight, 547 Worcester St., Christchurch, Canterbury, New Zealand, and Redvers Seymour Knight, Christchurch, Canterbury, New Zealand; said Redvers S. Knight assignor to said Irwin S. Knight
Filed Apr. 20, 1965, Ser. No. 449,600
Claims priority, application New Zealand, May 6, 1964, 138,109
3 Claims. (Cl. 219—432)

ABSTRACT OF THE DISCLOSURE

A holder for an electrically heated cooking vessel. The holder may be hung on a wall or inserted in a recess in a wall. The holder is provided with spaced slots downwardly inclined from the front to the rear of the holder which cooperate with pins placed upon the spout of a cooking vessel to lock the vessel to the holder. The holder and the vessel are provided with mating electrical contacts which supply current to a heating element in the vessel when the vessel is locked in the holder. Electrical cut-out means are provided on the holder for controlling the heating element circuit.

This invention relates to holding means for use in holding and supporting domestic appliances such as portable electrical appliances and in particular relates to an improved holding means for holding and supporting an electrical water heating appliance such as an electric jug, kettle or percolator, being a liquid container incorporating an electric heating element, whereby a cordless electrical connection between the appliance and a source of electric power supply can be effected and in a manner whereby the appliance is securely held in and by the holding means.

It is an object of this invention to provide an improved holder whereby an electrical appliance such as an electric jug can be held and secured thereby for the purposes of making a cordless electrical connection between the appliance and a source of electrical supply, said holder including means arranged to ensure that securement and engagement of the appliance with the holder is necessary before electrical connection can be made, and further to ensure that the securement of the appliance to the holder is such that withdrawal of the appliance from the holder by a downward or outward pulling motion cannot be effected.

A further object of the invention is to provide with the cordless electrical connection, a means for locating the appliance with its contents in a safe position normally inaccessible to young children, and with the holder being so formed that in the event of access being gained to the appliance normal outward and/or downward pulling motions will not disengage the appliance from the holder thus preventing the contents of the appliance from being accidentally spilled.

A still further object of this invention is to provide an improved holder for holding and supporting electrical appliances of the kind described whereby it is not necessary in the use of the appliance to locate the appliance on a surface of other articles of furniture or equipment.

According to this invention there is provided a holder which is engageable by an electrical appliance to receive and support said appliance, the holder comprising the holding means engageable with an upper portion of the appliance to secure said portion to the holder before a cordless electrical connection can be made between co-operable electric contacts provided on the appliance and on the holder, the holding means also being arranged to prevent downward and/or outward withdrawal of the appliance from said holder.

The invention will now be more particularly described with reference to the accompanying drawings, in which:

FIGURE 4 is a side elevation of a second embodiment of this invention.

FIGURE 5 is a front elevation, viewed in the direction of arrows V—V, of the holder of FIGURE 4.

Figure 1:
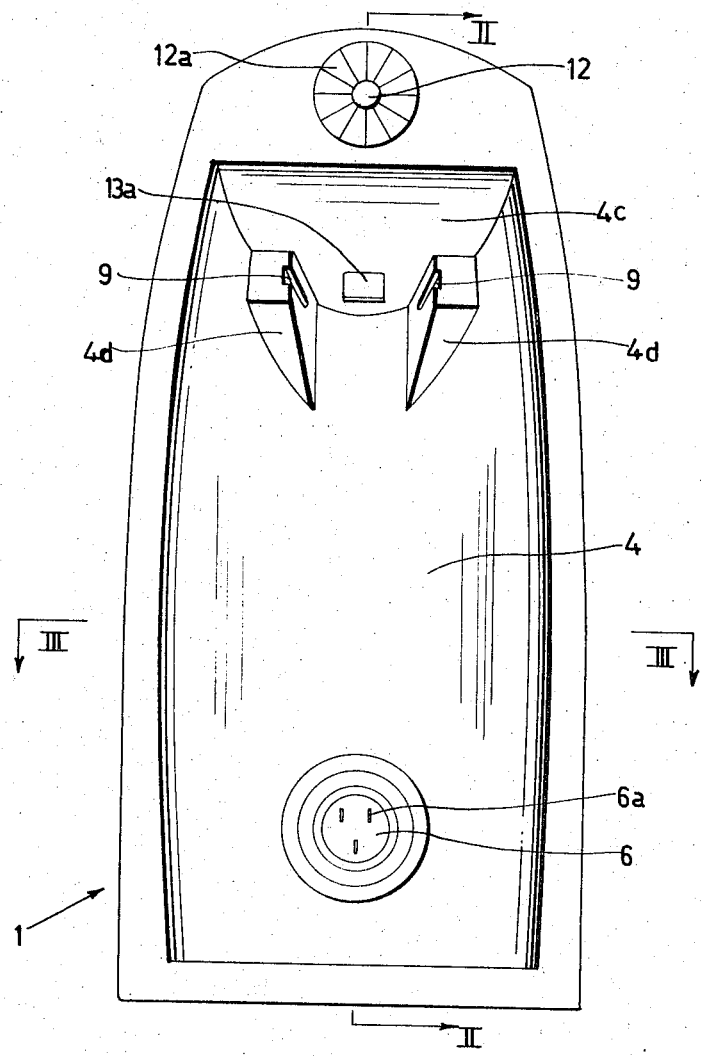
FIGURE 1 is a front elevation of the holder according to one form of the invention.
Figure 3:
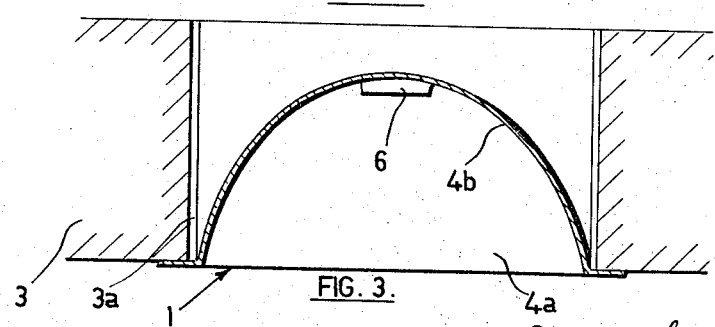
FIGURE 3 is a cross-sectional view on line III—III of FIGURE 1.
Figure 2:
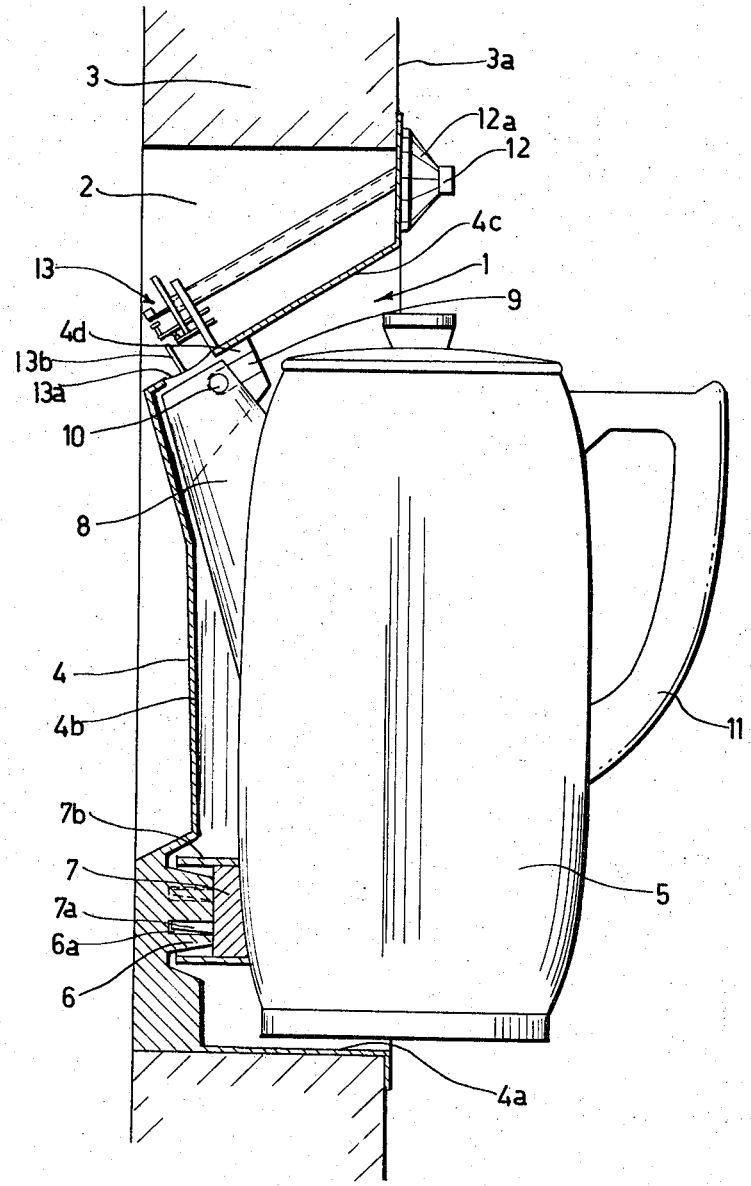
FIGURE 2 is a cross-sectional view of the holder on line II—II of FIGURE 1 and further illustrates an electric jug (shown in full) in a fitted or held position.
Figure 6:
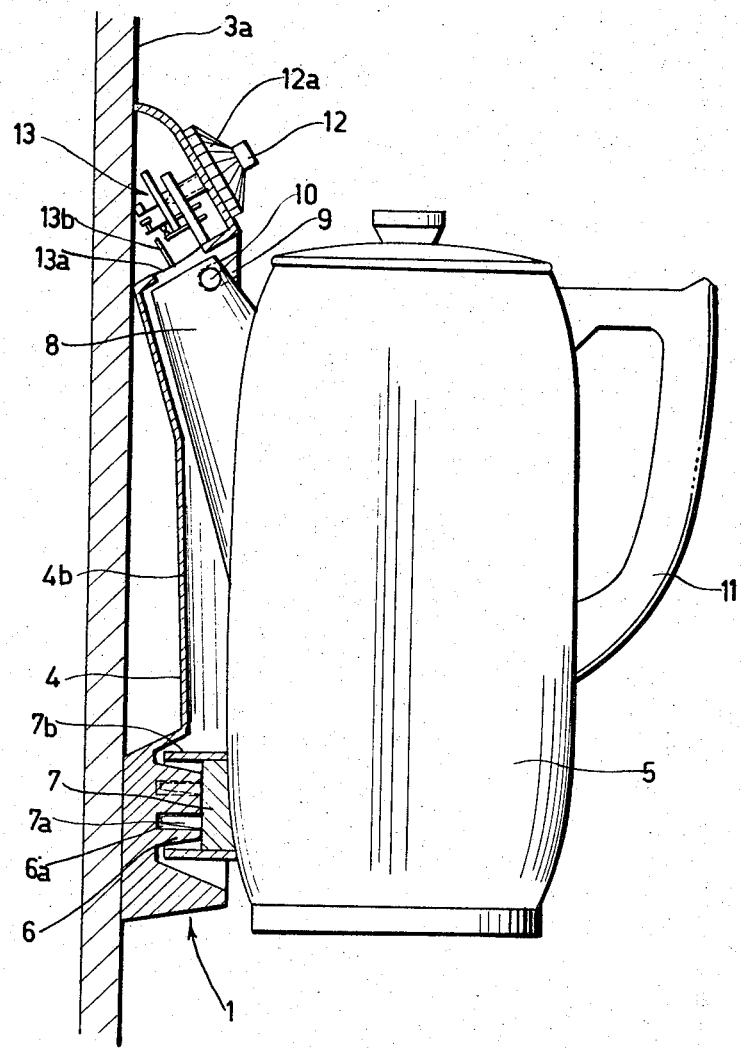
FIGURE 6 is a cross-sectional view of the holder of FIGURES 4 and 5 viewed in the direction of arrows VI—VI of FIGURE 5, and further illustrates an electric jug (shown in full) in a fitted or held position.

As shown in the drawings the holder of this invention, in both illustrated forms thereof, is generally indicated by the arrow 1, and in the first form of the invention shown in FIGURES 1, 2 and 3, the holder 1 is arranged for fitment in a recess 2 in a wall 3 (such as may be provided in the original construction of a building or room), or in such as the back panel of an electric range where the control switches are normally provided, while in the second form of the invention shown in FIGURES 4, 5 and 6, the holder 1 is designed for fitment to a wall surface 3a where a recess cannot be conveniently provided.

In both forms of the invention the holder 1 is preferably formed as a bracket 4, said bracket 4 being arranged either to fit in and/or form a recess 2 of a back panel of an electric range or of a wall 3 as in FIGURES 1 and 2, or directly on the wall surface 3a as in FIGURES 3, 4 and 5. The bracket 4 may be formed from any suitable material such as thermoplastics material, or a metal or wood, and may be coloured to contrast with or blend with surrounding colour schemes. It will be understood that the holder 1 of this invention will normally be provided in a room of a building where electrical appliances 5 such as electric jugs, kettles, coffee percolators and the like, are used, such as in a kitchen.

In each form of the invention, the bracket 4 is generally shaped to conform with the shape of the co-operating part of an electrical appliance 5 to be supported thereby and to be engaged and held therein, and in a preferred form of the invention the bracket 4 is intended to receive an electric jug 5, the jug 5 being held as shown in FIGURES 2 and 5.

In the first form of the invention the lower end of the bracket 4 is formed or provided with a substantially horizontal base portion 4a, and the bracket 4 has an arcuate or semi-circular upright portion 4b rising from said horizontal base portion 4a, said upright portion 4b preferably being generally arcuate or semi-circular in cross-section when viewed in plan as indicated in FIGURE 3 so as to conform with the corresponding part of the appliance 5. The upper part 4c of the bracket 4 is inclined downwardly from front to rear and the bracket thus formed having a recessed formation wherein the front part of the appliance can be housed. There is provided in the lower part of the upright portion 4b a female electrical connection 6 connected to a source of power supply, said female electrical connection being capable of receiving a male connection 7 formed or provided on the appliance 5, whereby a connection for electrical current supply between the source of power supply and the electrical heating element (not shown) normally provided in the appliance 5, is available.

The upper end part 4c is provided with a locating means whereby an upper portion 8 of the electrical appliance 5 can be engaged and secured in the bracket by the locating means. Such locating means in one form of the invention consists of a pair of spaced apart parallel locating slots or grooves 9 which are formed either in the walls of the bracket 4 or (as shown) in raised boss portions 4d of said bracket 4. The upper portion 8 of the appliance 5, which portion 8 is preferably the spout or pouring portion of the electrical appliance 5, is arranged for location between the slots or grooves 9.

The locating slots or grooves 9 are downwardly inclined with outer open ends 9a thereof being higher relative to inner closed ends thereof. The slots or grooves 9 are arranged to receive and have engaged therewith lateral studs or like projections 10 which are provided on the spout portion 8 of the electrical appliance 5.

In both forms of the invention an electrical appliance 5 can be conveniently engaged with the bracket 4 by tilting the appliance 5 so that the studs 10 on the spout portion 8 will engage in the inclined slots or grooves 9 in the upper part 4c of the bracket 4 following which the jug or like appliance 5 can be pivoted on the studs 10 so as to bring the male electrical contact member 7 into electrical contact with the female electrical contact member 6 provided in a lower portion of the bracket 4. To disengage the electric appliance 5, the foregoing operation is reversed.

Only when the jug or electrical appliance 5 has been securely held by engagement of the studs 10 in the slots or grooves 9 can the electrical connection be made, consequently it is not possible to make electrical connection between the electrical appliance and source of current supply unless the appliance is first secured and held by and in the bracket 4.

The bracket 4 in the second form of this invention is somewhat similar to the bracket 4 in the first described form except that a base portion 4a is not provided and the recess effect of the bracket 4 is less pronounced (see FIGURE 6). Further, the slots or grooves 9 to receive the studs 10 on the spout portion 8 of an appliance 5 are formed in the walls of the upright portion 4b of the bracket 4 and not in raised boss portions 4d.

The male electrical contact 7 on the appliance 5 is located below the spout portion 8 in the front of the appliance 5 (thus being in a position opposite to the position of the contacts of conventional appliances which use a flex or cord as the electrical connection means) and a handle 11 for the appliance 5 is positioned at the rear thereof.

The male contact member 7 on the appliance 5, and the female electric connection 6 on the bracket 4 can be any suitable kind facilitating a cordless electrical connection between appliance 5 and a source of power supply.

In a preferred form of the invention the male electrical contact member 7 on the front of the appliance 5 has a two or three-pin contact pins 7a, said contact pins 7a being engageable in female contacts 6a of the female electrical contact 6 formed or provided in the bracket 4. The male and female contacts 6a and 7a preferably have a substantially V-shaped formation to facilitate ease of electrical connection as the male contact pins 7a are brought into engagement with the female contacts 6a during pivotal movement of the electrical appliance 5 as hereinbefore described. A conventional ferrule 7b may surround the male contact pins 7a. In this manner a cordless electrical connection can be effected between appliance 5 and source of power supply.

In a modification of the invention (not shown) the spout or pouring portion 8 of the appliance 5 or an upper part of the appliance 5 is formed or provided with a hooked member (not shown), said hooked member being arranged to engage with a substantially horizontal supporting bar (not shown) provided in and across the upper part 4c of the bracket 4, whereby the upper portion of the electrical appliance 5 can be pivotally supported in the bracket 4.

Associated with the bracket 4 of this invention may be an electrical switch or like actuating means 12 whereby after an appliance 5 has been engaged with the bracket 4 as previously described and the male electrical contact member 7 is engaged with the female contact member 6 in the bracket 4, the switch 12 can be switched "on" to complete the electrical circuit whereby electric current is supplied to the electrical appliance 5. The switch 12 may incorporate an indicating means 12a such as a red light which will light up when current is flowing to the electrical appliance 5.

An electrical cut-out means, indicated by arrow 13, in FIGURE 6, may be associated with the bracket 4 to break the electrical circuit when the contents of the appliance 5 have been heated or brought to boiling point as the case may be.

One form of cut-out means 13, for use where the appliance 5 is such as an electric jug, or electric kettle, is preferably steam actuated; the cut-out means 13 being provided in the upper part 4c of the bracket 4 above the spout or pouring portion 8 of the appliance 5 so that when the contents thereof have been boiled the steam issuing from the spout portion 8 will actuate the cut-out means 13 to break the electrical circuit and thus interrupt the supply of electric power to the electrical appliance 5. It will be understood that any suitable electric cut-out means 13 can be adapted for use with the holder 1, the drawings showing by way of example a movable diaphragm 13a arranged for actuation by the pressure or velocity of the steam issuing from the spout 8 of the jug 5, with said diaphragm 13a having a pin member 13b arranged to move therewith to disconnect the electrical connections of the switch 12 (see FIGURES 2 and 6).

Thus by this invention a safe cordless electrical connection for domestic electrical appliances can be provided.

What we do claim and desire to obtain by Letters Patent of the United States of America is:

1. A device comprising in combination, a cooking vessel having electrical heating means thereon, a holder for said cooking vessel, means on said holder for supplying electrical energy to said heating means, cooperative means on said vessel and said holder for electrically connecting said energy supply means to said heating means when said vessel and said holder are brought into cooperative relation, said holder having spaced slots downwardly inclined from the front to the rear and means on said vessel cooperating with said slots to maintain said holder and said vessel in cooperative relationship when said cooperative means are engaged to supply electrical energy so that said vessel may not be pulled downwardly or horizontally outwardly when in cooperative relationship, a spout on said vessel and said means cooperating with said slots being placed upon said spout.

2. A device as set forth in claim 1 wherein said means cooperating with said slots comprise pins upon said spout.

3. A device as set forth in claim 1 wherein said slots downwardly inclined from the front to the rear have outer open ends higher relative to the inner closed ends so that the engagement of said vessel with said holder by said means on said vessel cooperating with said slots is effected by tilting said vessel.

References Cited

UNITED STATES PATENTS

| | | | |
|---|---|---|---|
| 1,227,935 | 5/1917 | Robertson | 219—436 X |
| 2,282,866 | 5/1942 | Hagen. | |
| 2,350,941 | 6/1944 | Stevenson | 219—432 |
| 2,450,336 | 9/1948 | Hall | 219—432 |
| 2,543,052 | 2/1951 | Park | 219—435 X |

FOREIGN PATENTS 207,452    4/1957    Australia.

ANTHONY BARTIS, *Primary Examiner.*